United States Patent
Millif et al.

(10) Patent No.: US 6,214,266 B1
(45) Date of Patent: Apr. 10, 2001

(54) METHOD FOR INJECTION MOLDING PLASTIC PARTS

(75) Inventors: John Gregory Millif, Dayton; Hiroaki Yamamoto, Brookville; Takeshi Yamamoto, Worthington; Kazuo Igarashi, Powell, all of OH (US)

(73) Assignees: Green Tokai Co., Ltd., Brookville, OH (US); Honda Giken Kogyo Kabushiki Kaisya, Tokyo (JP)

( * ) Notice: Subject to any disclaimer, the term of this patent is extended or adjusted under 35 U.S.C. 154(b) by 0 days.

(21) Appl. No.: 09/286,750

(22) Filed: Apr. 6, 1999

(51) Int. Cl.[7] .................................................. B29C 45/14

(52) U.S. Cl. ........................... 264/129; 264/1.7; 264/250; 264/255; 425/129.1; 428/412; 428/446

(58) Field of Search ...................................... 264/129, 250, 264/255, 245, 247, 328.7, 1.7; 425/127, 129.1; 428/409, 412, 451, 446

(56) References Cited

U.S. PATENT DOCUMENTS

| | | |
|---|---|---|
| 3,122,598 | 2/1964 | Berger . |
| 3,154,617 | 10/1964 | Schenk et al. . |
| 3,458,386 | 7/1969 | Shanok et al. . |
| 3,493,257 | 2/1970 | Fitzgerald et al. . |
| 3,809,733 * | 5/1974 | Sandiford et al. ............... 264/45 |
| 3,914,482 | 10/1975 | Sawa et al. . |
| 4,029,454 | 6/1977 | Monnet . |
| 4,052,522 | 10/1977 | Narita . |
| 4,060,577 | 11/1977 | Collins . |
| 4,076,790 | 2/1978 | Lind . |
| 4,089,537 | 5/1978 | Pralutsky . |
| 4,094,056 | 6/1978 | Takeda et al. . |
| 4,216,184 | 8/1980 | Thomas . |
| 4,220,681 | 9/1980 | Narita . |
| 4,230,659 | 10/1980 | Sutch . |
| 4,275,099 | 6/1981 | Dani . |
| 4,293,520 | 10/1981 | Akutsu . |
| 4,348,462 * | 9/1982 | Chung ................................. 428/412 |
| 4,367,262 * | 1/1983 | Vaughn, Jr. ........................ 428/331 |
| 4,396,678 * | 8/1983 | Olson ................................. 428/412 |
| 4,401,232 | 8/1983 | Constable et al. . |
| 4,414,731 | 11/1983 | Riemer . |
| 4,416,843 | 11/1983 | Helms . |
| 4,420,447 | 12/1983 | Nakashima . |
| 4,497,763 | 2/1985 | Monnet . |
| 4,515,649 | 5/1985 | Nussbaum . |
| 4,599,262 | 7/1986 | Schulte et al. . |
| 4,600,461 | 7/1986 | Guy . |
| 4,643,789 | 2/1987 | Parker et al. . |
| 4,647,274 | 3/1987 | Oda . |
| 4,710,338 | 12/1987 | Bagnall et al. . |
| 4,722,818 | 2/1988 | Zoller . |
| 4,734,147 | 3/1988 | Moore . |
| 4,783,347 | 11/1988 | Doin et al. . |
| 4,797,244 | 1/1989 | Sauer . |
| 4,808,450 | 2/1989 | Guy . |
| 4,904,525 | 2/1990 | Taniguchi et al. . |
| 4,911,959 | 3/1990 | Miyakawa . |
| 4,913,760 | 4/1990 | Benson et al. . |
| 4,927,675 | 5/1990 | Adams et al. . |
| 4,957,682 | 9/1990 | Kobayashi et al. . |
| 4,968,474 | 11/1990 | Ito . |

(List continued on next page.)

Primary Examiner—Jan H. Silbaugh
Assistant Examiner—Edmund H. Lee
(74) Attorney, Agent, or Firm—Biebel & French

(57) ABSTRACT

A method for injection molding a plastic part having a coating which suppresses the appearance of colored interference fringes in fluorescent light including the steps of injection molding a plastic substrate; injection molding a light transmissive intermediate layer having an optical thickness of about 800–1,200 $\mu$m onto a show surface of the plastic substrate; and forming a light transmissive outer coating having an optical thickness of about 5.5–11.5 $\mu$m over the intermediate layer. The outer coating should be harder than the substrate such that the resulting part has a scratch resistance superior to that of the substrate alone.

12 Claims, 3 Drawing Sheets

U.S. PATENT DOCUMENTS

| | | |
|---|---|---|
| 5,000,902 | 3/1991 | Adams . |
| 5,023,033 | 6/1991 | Cakmakci . |
| 5,026,448 * | 6/1991 | Rearfler et al. .................. 156/212 |
| 5,096,652 | 3/1992 | Uchiyama et al. . |
| 5,098,633 | 3/1992 | Hausler . |
| 5,108,681 | 4/1992 | Cakmakci . |
| 5,162,124 | 11/1992 | Hausler et al. . |
| 5,178,708 | 1/1993 | Hara et al. . |
| 5,182,145 | 1/1993 | Kato . |
| 5,193,711 | 3/1993 | Hirata et al. . |
| 5,194,194 | 3/1993 | Kato et al. . |
| 5,194,305 | 3/1993 | Shirahata et al. . |
| 5,203,941 | 4/1993 | Spain et al. . |
| 5,227,108 | 7/1993 | Reid, Jr. et al. . |
| 5,264,172 | 11/1993 | Rosica et al. . |
| 5,336,460 | 8/1994 | Hettinga . |
| 5,342,666 | 8/1994 | Ellison et al. . |
| 5,353,154 | 10/1994 | Lutz et al. . |
| 5,368,798 | 11/1994 | Mizukoshi et al. . |
| 5,401,457 | 3/1995 | Valyi . |
| 5,456,786 | 10/1995 | Cook et al. . |
| 5,456,957 | 10/1995 | Jackson et al. . |
| 5,490,893 | 2/1996 | Enlow et al. . |
| 5,503,939 | 4/1996 | Rink et al. . |
| 5,523,116 | 6/1996 | Ueno et al. . |
| 5,571,581 | 11/1996 | Koizumi et al. . |
| 5,599,608 | 2/1997 | Yamamoto et al. . |
| 5,654,090 * | 8/1997 | Kayanoki .................. 428/329 |
| 5,746,962 | 5/1998 | Yamamoto . |
| 5,783,287 | 7/1998 | Yamamoto et al. . |
| 5,789,082 * | 8/1998 | Treadway .................. 428/412 |
| 6,013,210 * | 1/2000 | Gardner, Jr. .................. 264/40.1 |

\* cited by examiner

METHOD FOR INJECTION MOLDING PLASTIC PARTS

FIELD OF THE INVENTION

The present invention pertains to methods for injection molding plastic parts having coatings which suppress the appearance of colored interference fringes in fluorescent light and to parts made by these methods.

BACKGROUND OF THE INVENTION

Polycarbonates, which comprise dihydric or polyhydric phenols linked by carbonyl groups, are often injection molded to form parts having low dimensional tolerances as well as excellent impact resistances over wide temperature ranges. Drawbacks to the use of these polymers include their low scratch and chemical resistances. For this reason, and for improved appearance, polycarbonate moldings are often coated with other materials having greater hardnesses or other desirable surface properties.

For example, Adams et al. U.S. Pat. No. 4,927,675 proposed a coextruded multilayer material comprising a thermoplastic core layer having at least one inorganic and/or organic constituent dispersed therein; a first coextruded thermoplastic outer layer attached to a first surface of the thermoplastic core layer and substantially free of dispersed inorganic and organic constituents; and a second coextruded outer layer attached to a second surface of the core layer opposite the first surface and substantially free of dispersed inorganic or organic constituents. The thermoplastic core layer was typically a polycarbonate, as were the first and second coextruded outer layers. A coating material, for example silicone polymer (that is, an organopolysiloxane polymer or copolymer), might be applied on the first and second outer layers after coextrusion of the multilayer material in those instances in which additional physical properties were desired, such as abrasion resistance. Adams et al. asserted that such multilayer materials overcame the defects of prior art monolayer materials which might damage extruders or auxiliary equipment and which might allow colorants and reinforcing agents to react unfavorably with subsequently applied dyes or inks.

Automobiles and other land vehicles are often displayed for sale in enclosed showrooms lit by fluorescent lights. Under such lighting conditions, unsightly optical interference fringes forming "rainbow" or "cat's eye" patterns have been observed on door sashes and cowl covers comprising injection molded black polycarbonate substrates with overlying 4–8 μm silicone polymer coatings. These colored interference fringes may render such automobiles less attractive to potential purchasers. It is an object of the present invention to suppress the appearance of colored interference fringes on coated plastic parts.

Such interference patterns are believed to result from the wave nature of light. As is well known, light is an electromagnetic field whose strength varies periodically with both time and distance as the field moves past a given location. The field strength at any location is additive—that is, if two beams are moving through the same location at the same time in the same direction, the total field strength would be the sum of the field strength of each of the two beams at that location.

It is possible to characterize a light beam by imagining it as the combination of a series of coincident component beams, each of whose field strengths vary only for a certain amount of time characteristic of that component (referred to as a "period") before repeating themselves. Since the speed of light, that is, the speed at which the electromagnetic field is moving through a particular material, is a constant (equal to the speed of light in a vacuum divided by an "index of refraction" of the material), each such component beam moves through a characteristic distance (referred to as a "wavelength") during its period.

A component of light having a particular period and wavelength when moving through one material will have a different wavelength when moving through a different material. In fact, it is the product of multiplying the wavelength of the component in a particular material by the index of refraction of that material which remains constant. Thus, "optical distances," that is, the products of multiplying measured distances through materials by the indices of refraction of those materials, are often compared when studying the movement of light through laminate materials. Despite the changes in the values of the wavelengths as the components move from one material to another, the term "wavelengths" will be used as a shorthand for these components.

Each wavelength within the range of about 400–700 nm is perceived as a color. White light is a combination of many different wavelengths (that is, many different colors), all traveling in the same direction at the same time.

Ideally, the variation of the field strength for a given wavelength over time would be "sinusoidal" (that is, would correspond with a "sine function" such as that shown graphically at 10 in FIG. 1). The variation of the fields strength with distance in the direction in which the beam is moving also would be ideally sinusoidal. If two such ideal beams from different sources were combined, the sine function expressing the field strength for a particular wavelength in one beam may be delayed (that is, shifted to the right with respect to the axis 12 in FIG. 1) relative to the corresponding sine function for that wavelength in the other beam. Then, there is said to be a "phase difference" between the two components at that wavelength. If one of the two sine functions is delayed by half of the period 14 (that is, if they are "fully out of phase" as shown graphically at 10 and 16 in FIG. 1), the two components "destructively interfere" with each other and make no contribution to the intensity or color of the combined light beam.

Although applicants are not to be bound by any particular theory of operation of the invention, it is believed that the prior art door sashes and cowl covers produce colored interference fringes due to destructive interference between light partially reflected off the surface of the silicone polymer coating and light reflected from the interface between the black polycarbonate substrate and the coating. When white light impinges on the outer surface of the silicone polymer coating, the coating transmits a portion of the light toward the interface with the substrate and reflects the remainder. Next, the substrate absorbs some of the portion transmitted by the coating and reflects the rest of that portion back toward the outer surface of the silicone polymer coating. In particular, a black substrate will absorb or reflect all colors (that is, wavelengths) of light approximately equally, which promotes the formation of interference fringes. The light partially reflected from the outer surface of the coating and from the substrate then recombines on the outer surface of the coating and projects toward the viewer.

When the reflected light recombines, certain wavelengths of the light reflected off the substrate are approximately fully out of phase with the corresponding wavelengths in the light reflected off the coating because the light partially reflected off the substrate travels a greater distance than that partially reflected off the outer surface. These wavelengths undergo destructive interference and are removed from the light projected toward the observer. The observer sees bands or fringes of light tinted by the wavelengths remaining in the projected light.

SUMMARY OF THE INVENTION

The object of suppressing the appearance of colored interference fringes under fluorescent lighting, and other objects, are met by the method for injection molding plastic parts of the present invention and by the parts made by that method. It should be kept in mind that the method is not limited to the fabrication of coated polycarbonate parts, but is of general application in the injection molding art.

The method comprises the steps of injection molding a plastic substrate; fixedly securing a light transmissive intermediate layer having an optical thickness of about 800–1,200 $\mu$m onto a show surface of the plastic substrate; and forming a light transmissive outer coating having an optical thickness of about 5.5–11.5 $\mu$m over the intermediate layer. The outer coating should be harder than the substrate such that the resulting part has a scratch resistance superior to that of the substrate alone.

Preferably, the substrate and the intermediate layer are formed from polycarbonate materials while the outer coating is formed from a silicone polymer to provide a scratch-resistant protective outer surface for the part. Most preferably, the substrate is formed by adding a pigment or other coloring agent (for example, a black pigment) to a clear polycarbonate resin to form a colored polycarbonate resin and then injection molding the substrate from the colored polycarbonate resin. Thereafter, the intermediate layer is secured over the substrate, preferably by injection molding the same clear polycarbonate resin over a show surface of the substrate.

The intermediate layer is preferably formed by inserting the substrate in a mold with a clearance on the order of 0.5–1.0 mm above the show surface of the substrate, injecting the clear polycarbonate resin into the mold and allowing the resin to harden. Alternatively, one may first mold the intermediate layer, insert the intermediate layer into a second injection mold and inject colored polycarbonate resin to form the substrate beneath the intermediate layer. Such insert molding techniques are described generally in U.S. Ser. No. application 08/763,710 filed Dec. 12, 1996, now U.S. Pat. No. 5,759,477, the disclosure of which is incorporated by reference.

It is noted that the clear polycarbonate resin may also be secured over the substrate by conventional extrusion or vacuum molding techniques.

The silicone polymer coating is preferably applied by dissolving the silicone polymer in a suitable solvent, painting the polymer solution on the surface of the clear polycarbonate layer and inducing the solvent to evaporate.

According to an especially preferred embodiment, the method produces a plastic part for a land vehicle comprising a substrate, a light transmissive intermediate layer and a light transmissive outer coating. The intermediate layer has an optical thickness of about 800–1,200 $\mu$m and the outer coating, which is formed from a material having an index of refraction less than an index of refraction of the intermediate layer, has an optical thickness of about 5.5–11.5 $\mu$m. The outer coating is preferably formed from a material harder, and thus more scratch resistant, than the material from which the substrate is formed.

Without wishing to be bound by any theory of operation, it is believed either the additional interface between the outer coating and the intermediate layer or the thickness of the light transmissive intermediate layer, or both, contribute to suppressing the appearance of colored interference fringes on the outer surface of the injection molded parts of the invention. In the prior art coated parts, it is believed that two portions of the incident light were partially reflection from two different interfaces whereby certain wavelengths were subject to destructive interference when the portions were recombined. In the injection molded parts of the invention, there are three interfaces from which light may partially reflect. It is thought that recombining three partially reflected portions of the incident light which have traveled three different optical distances prior to recombination complicates the phase relationships between the partially reflected portions and decreases the likelihood of destructive interference at any wavelength.

Unlike the ideal situation described in connection with FIG. 1 and the prior art, fluorescent light typically is "incoherent," that is, the variation of its field strength with distance and time is not purely sinusoidal at many, if not all, wavelengths. It is believed that the relatively small (5.5–11.5 $\mu$m) optical thicknesses of the prior art coatings provided insufficient room for the incoherence of the incident light to strongly affect the formation of interference fringes on the outer surface of the coated parts. On the other hand, the optical thickness of the intermediate layer of the invention (that is, 800–1,200 $\mu$m) is very large compared to the wavelengths of visible light (that is, approximately 0.4–0.7 $\mu$m). Within the thickness of the intermediate layer, the incoherence of the fluorescent light will likely be a greater factor in complicating the phase relationships between the partially reflected portions of the light, thereby decreasing the likelihood of destructive interference at any wavelength.

The invention will be further described in conjunction with the appended drawings and detailed description.

DETAILED DESCRIPTION OF THE PREFERRED EMBODIMENT(S)

Figure 1:
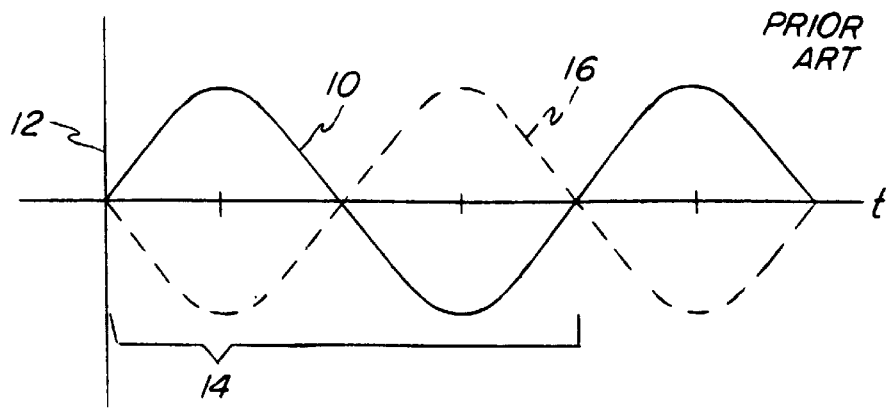
FIG. 1 is a graphical view of a sine function.
Figure 2:
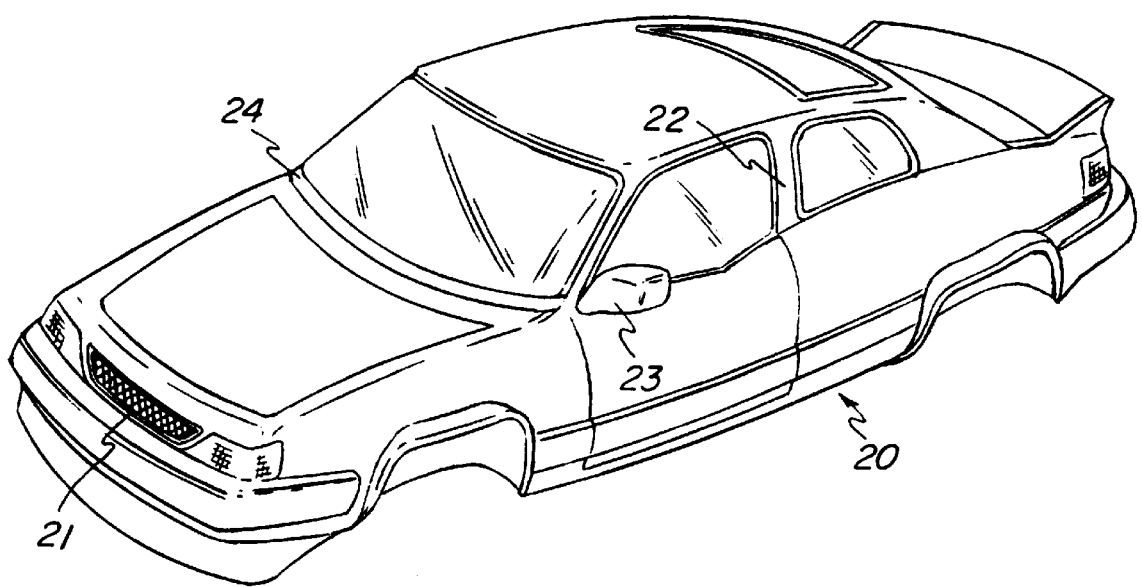
FIG. 2 is a perspective view of an automotive body illustrating the location of door sashes and a cowl covers made in accordance with the invention.

As shown in FIG. 2, a body 20 for an automobile includes a plurality of injection molded plastic parts, such as a front grille cover 21, door sash 22, mirror housing 23 and a cowl cover 24. While a preferred embodiment of the invention will be described in terms of the fabrication of a door sash 22, it should be kept in mind that the invention is not limited to such parts but is of general application in the injection molding art. Specific, non-limiting examples of such parts that may be made in accordance with the invention include the parts 21, 22, 23 and 24 shown in FIG. 2.

Figure 3:
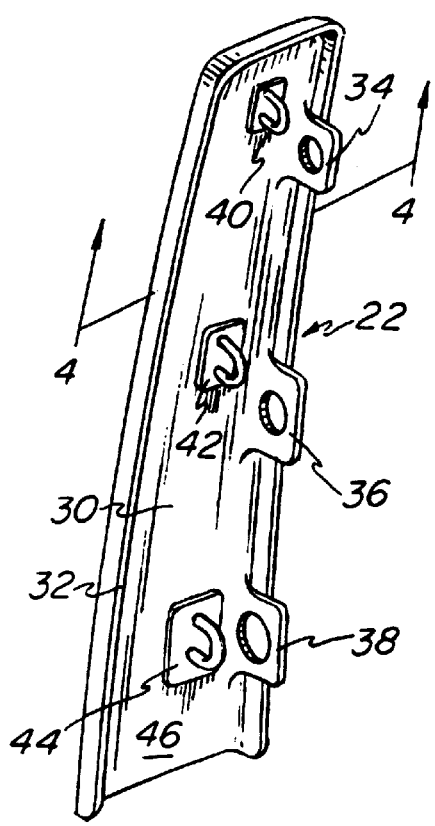
FIG. 3 is a rear perspective view of a door sash for the body of FIG. 2 made in accordance with the method of the invention.

As shown in FIG. 3, the preferred door sash 22 includes a curved plate portion 30 surrounded on three sides by a lip 32. A plurality of mounting projections 34, 36, 38, 40, 42 and 44 project from a rear surface 46 of the plate portion 30 for mounting the door sash 22 on the body 20.

Figure 4:
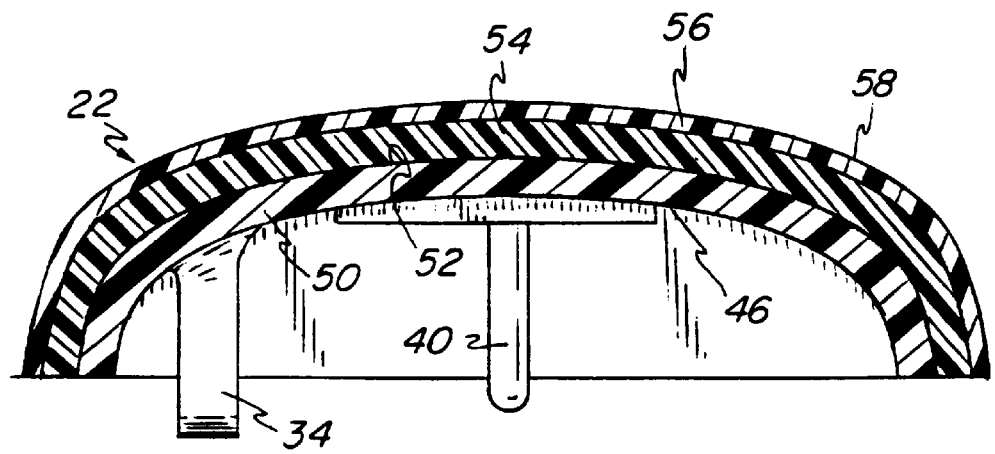
FIG. 4 is a schematic sectional view of the door sash of FIG. 3 taken along the line 4—4 of FIG. 3.

As shown in FIG. 4, the door sash 22 comprises a substrate 50 defining a show surface 52 and the rear surface 46 from which the mounting projections (only 34 and 40 shown in FIG. 4) extend; an intermediate layer 54 covering the show surface 52 of the substrate 50; and an outer coating 56 defining an outer surface 58 formed over the intermediate layer 54. The rear surface 46 is exposed in the sense that it is not covered by the intermediate layer 54 or the outer coating 56.

The substrate 50 is preferably formed from injection molded black polycarbonate. The intermediate layer 54 is preferably formed from a light transmissive, injection molded clear polycarbonate and has a thickness of about 0.5–1.0 mm. The outer coating 56 is preferably formed from light transmissive silicone polymer and has a thickness of about 4–8 $\mu$m.

Polycarbonates have indices of refraction for sodium-D light of about 1.58–1.60, while silicone polymers have indices of refraction for the same wavelength on the order of about 1.35–1.45. Thus, in the preferred door sash 22, the intermediate layer 54 has an optical thickness of about 800–1,200 $\mu$m and the outer coating has an optical thickness of about 5.5–11.5 $\mu$m.

The preferred outer coating 56 is harder than the polycarbonate from which the substrate 50 is formed so that the outer coating 56 improves the scratch resistance along the outer surface 58 of the door sash 22. For this reason, the outer coating 56 should be sufficiently thick to provide effective scratch resistance without being so thick that impact resistance is sacrificed.

The preferred door sash 22 may be made by the following steps. First, a pigment or other coloring agent is combined with a clear polycarbonate resin in a manner known to those of ordinary skill in the art to form a black polycarbonate resin. This black polycarbonate resin is injected into a first injection mold 70 (FIG. 5) and allowed to harden to form the substrate 50. The substrate 50 is inserted into a second injection mold 72 (FIG. 6). Then, in accordance with the preferred method of manufacture, clear polycarbonate resin of the same composition as that used to form the black polycarbonate resin of the substrate 50 is injected into the second injection mold 72 over the show surface 52 of the substrate 50 and allowed to harden to form the intermediate layer 54. Silicone polymer is dissolved in a suitable solvent, painted or otherwise applied over the intermediate layer 54 and allowed to harden to form the outer coating 56.

Figure 5:
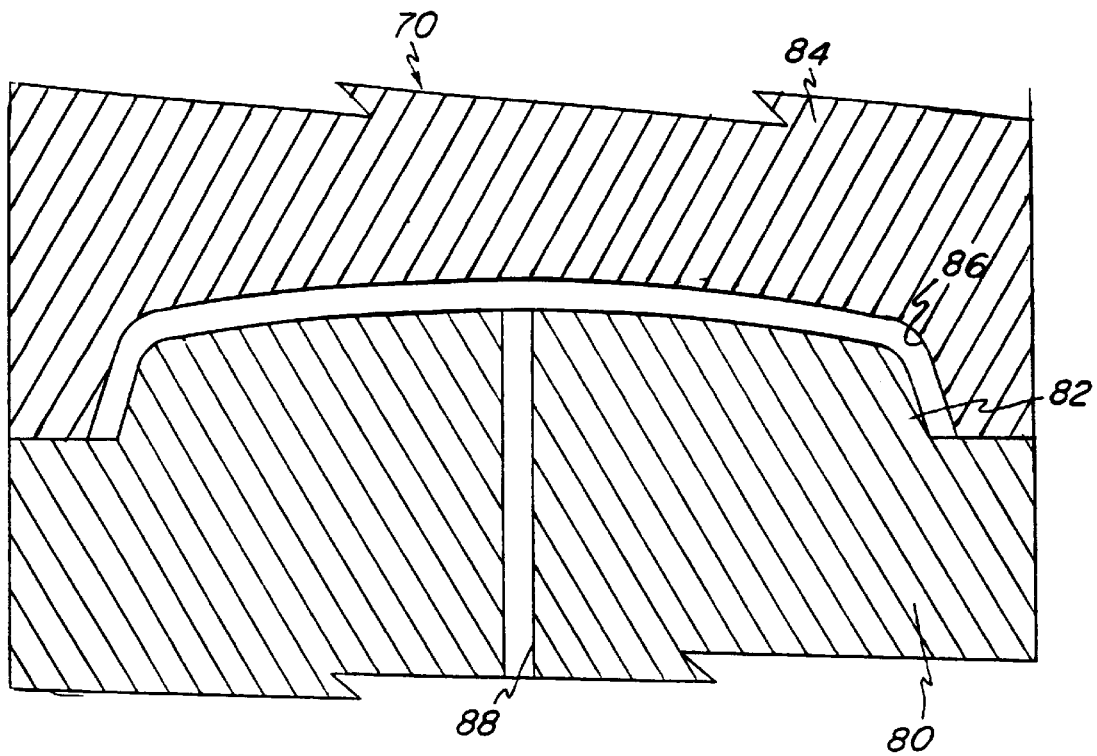
FIG. 5 is a schematic sectional view of an injection mold for making a substrate for the door sash of FIG. 3.
Figure 6:
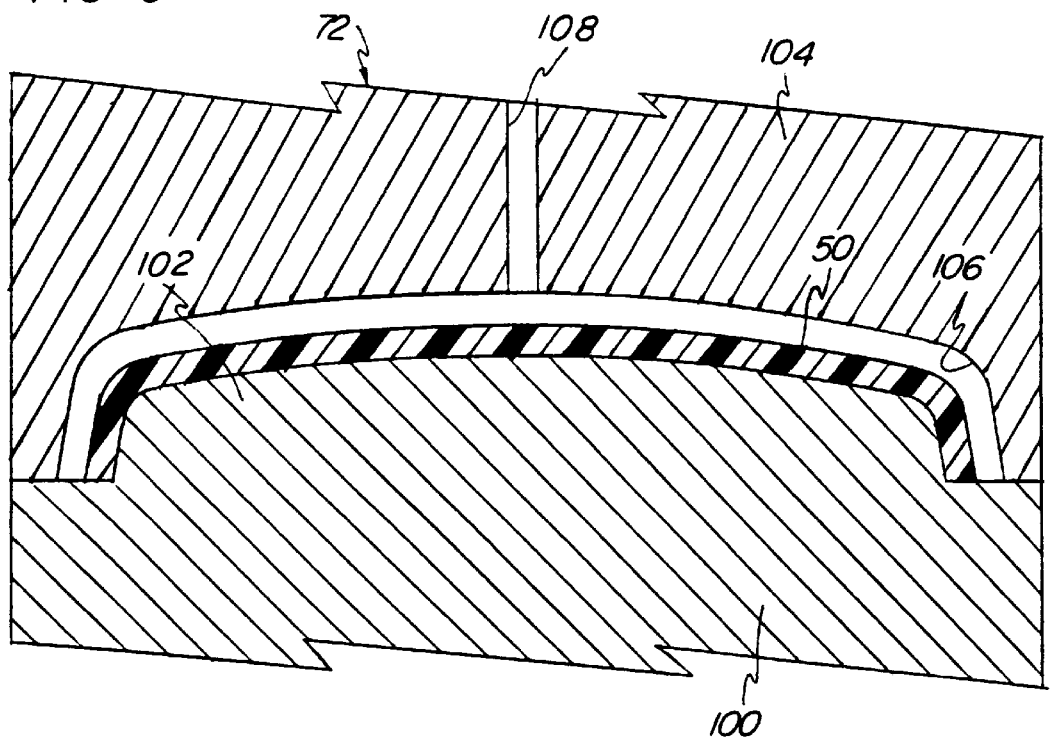
FIG. 6 is a schematic sectional view of an injection mold for forming an intermediate layer for the door sash of FIG. 3.

A suitable first injection mold 70 for molding the substrate 50 is shown in section in FIG. 5. The first injection mold 70 includes a male mold member 80 having a male core 82 which cooperates with a female mold member 84 to define a mold cavity 86. The first injection mold 70 also includes a gate 88 which preferably communicates with the mold cavity 86 through the male core 82. During the process of forming the door sash 22 (FIGS. 3–4), black polycarbonate resin is injected under pressure through the gate 88 into the mold cavity 86 and allowed to harden to form the substrate 50. Space (not shown) may be provided in the male mold member 70 to form the mounting projections 34, 36, 38, 40, 42, 44 (FIG. 3) of the door sash 22 (FIGS. 3–4). Alternatively, the mounting projections 34, 36, 38, 40, 42, 44 may be formed separately and welded to the rear surface 46 of the substrate 50.

A suitable second injection mold 72 for forming the intermediate layer 54 is shown in FIG. 6. The second injection mold 72 includes a male mold member 100 having a male core 102 which cooperates with a female mold member 104 to define a mold cavity 106. The second injection mold 72 also includes a gate 108 which preferably communicates with the mold cavity 106 through the female mold member 104. During the process of forming the door sash 22 (FIGS. 3–4), the substrate 50 is inserted into the mold cavity 106 and rests on the male core 102. Clear polycarbonate resin is injected under pressure through the gate 108 into the portion of the mold cavity 106 between the show surface 52 of the substrate 50 and the female mold member 104. The clear polycarbonate resin is allowed to harden to form the intermediate layer 54 over the substrate 50.

Door sashes 22 and other parts made by the method of the present invention have not been observed to show colored interference fringes in fluorescent light. Without wishing to be bound by any theory of operation, it is believed that the substrate 50, the intermediate layer 54 and the outer coating 56 of the door sash 22 (FIG. 4) define three interfaces from which portions of light incident on the outer surface 58 may partially reflect. Recombining three partially reflected portions of the incident light which have traveled three different optical distances prior to recombination complicates the phase relationships between the partially reflected portions and decreases the likelihood of destructive interference at any wavelength. Furthermore, it is believed that the relatively thick, light transmissive intermediate layer 54 increases the effect of the incoherence of the fluorescent light on the phase relationships of the partially reflected portions of the light, thereby decreasing the likelihood of destructive interference at any wavelength.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method for making a plastic part for a land vehicle, the plastic part suppresses the appearance of colored interference fringes, comprising the steps of:

injection molding a substrate;

securing a light transmissive intermediate layer having an optical thickness of about 800–1,200 $\mu$m onto a show surface of the substrate; and forming a light transmissive outer coating having an optical thickness of about 5.5–11.5 $\mu$m over the intermediate layer, said outer coating being harder than said substrate.

2. The method as recited in claim 1 wherein said step of injection molding said substrate includes injection molding said substrate from a colored polycarbonate resin.

3. The method as recited in claim 1 wherein said step of injection molding said substrate includes injection molding said substrate from a black polycarbonate resin.

4. The method as recited in claim 1 wherein said step of securing said intermediate layer onto said show surface of said substrate comprises injection molding.

5. The method as recited in claim 4 wherein said step of injection molding said substrate includes adding a coloring agent to a clear resin to form a colored resin and injection molding said substrate from said colored resin; and said step of injection molding said intermediate layer includes injection molding said intermediate layer from said clear resin.

6. The method as recited in claim 1 wherein said step of forming said outer coating includes dissolving a polymer coating material in a solvent to form a coating solution; applying said coating solution to said intermediate layer; and inducing said solvent to evaporate.

7. The method as recited in claim 1 wherein said step of forming said outer coating includes forming said outer coating from a silicone polymer.

8. A method for making a plastic part for a land vehicle, the plastic part suppresses the appearance of colored interference fringes, comprising the steps of:

injection molding a substrate;

securing a light transmissive intermediate layer having an optical thickness of about 800–1,200 $\mu$m onto a show surface of the substrate;

dissolving a silicone polymer in a solvent to form a coating solution; and applying the coating solution in a thickness of 4–8 $\mu$m to an outer surface of the intermediate layer whereby said coating solution forms a silicone polymer coating after said solvent evaporates.

9. The method as recited in claim 8 wherein said step of injection molding said substrate includes injection molding said substrate from a colored polycarbonate resin.

10. The method as recited in claim 8 wherein said step of injection molding said substrate includes injection molding said substrate from a black polycarbonate resin.

11. The method as recited in claim 8 wherein said step of securing comprises injection molding a clear polycarbonate resin over said substrate.

12. A method for making a plastic part for a land vehicle, the plastic part suppresses the appearance of colored interference fringes, comprising the steps of:

adding a black coloring agent to a clear polycarbonate resin to form a black polycarbonate resin;

injection molding said black polycarbonate resin to form a substrate;

injection molding a light transmissive intermediate layer from said clear polycarbonate resin having a thickness of about 0.5–1.0 mm onto a show surface of the substrate;

dissolving a silicone polymer in a solvent to form a coating solution; and applying the coating solution in a thickness of 4–8 $\mu$m to an outer surface of the intermediate layer whereby said coating solution forms a silicone polymer coating after said solvent evaporates.

* * * * *